(12) United States Patent
Maruno

(10) Patent No.: US 11,173,596 B2
(45) Date of Patent: Nov. 16, 2021

(54) WORKING UNIT AND WORKING DEVICE

(71) Applicant: HIRATA CORPORATION, Kumamoto (JP)

(72) Inventor: Yutaro Maruno, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 545 days.

(21) Appl. No.: 16/127,323

(22) Filed: Sep. 11, 2018

(65) Prior Publication Data

US 2019/0001485 A1 Jan. 3, 2019

Related U.S. Application Data

(63) Continuation of application No. PCT/JP2017/008753, filed on Mar. 6, 2017.

(30) Foreign Application Priority Data

Mar. 15, 2016 (JP) .............................. JP2016-051348

(51) Int. Cl.
*B25J 9/00* (2006.01)
*B25J 9/02* (2006.01)
(Continued)

(52) U.S. Cl.
CPC ................. *B25J 9/02* (2013.01); *B23P 19/04* (2013.01); *B23Q 1/0009* (2013.01); *B23Q 1/012* (2013.01);
(Continued)

(58) Field of Classification Search
CPC ..... B25J 9/02; B25J 9/104; B25J 9/102; B25J 17/0258; B25J 17/0266; B25J 17/0283;
(Continued)

(56) References Cited

U.S. PATENT DOCUMENTS 5,155,423 A 10/1992 Karlen et al.
5,178,031 A 1/1993 Orsi et al.
(Continued)

FOREIGN PATENT DOCUMENTS

CN 101511527 A 8/2009
CN 101767285 A 7/2010
(Continued)

OTHER PUBLICATIONS

Extended European Search Report dated Feb. 19, 2019, issued by the European Patent Office in corresponding European Application No. 17766428.1. (9 pages).
(Continued)

*Primary Examiner* — Luis A Gonzalez
(74) *Attorney, Agent, or Firm* — Buchanan Ingersoll & Rooney PC

(57) ABSTRACT

A working unit includes a tool rotation mechanism, a first turning mechanism turning the tool rotation mechanism about a first axis, and a second turning mechanism turning the tool rotation mechanism and the first turning mechanism about a second axis perpendicular to the first axis. The first turning mechanism includes a motor having a stator connected to the second turning mechanism and a hollow shaft-shaped rotor arranged inside the stator in such a manner that the rotor is capable of rotating about the first axis, and a second rotating body including one arm portion coupled to one end portion of the rotor, the other arm portion coupled to the other end portion of the rotor, and an arm coupling portion that couples the arm portions to each other. The tool rotation mechanism is provided on the second rotating body.

13 Claims, 6 Drawing Sheets

(51) Int. Cl.
*B23P 19/04* (2006.01)
*B25J 19/00* (2006.01)
*H02K 37/24* (2006.01)
*B23Q 1/00* (2006.01)
*B23Q 1/54* (2006.01)
*B23Q 1/01* (2006.01)
*B25J 17/02* (2006.01)
*B23Q 5/10* (2006.01)
*B25J 9/10* (2006.01)

(52) U.S. Cl.
CPC ............ *B23Q 1/5406* (2013.01); *B23Q 5/10* (2013.01); *B25J 9/026* (2013.01); *B25J 9/104* (2013.01); *B25J 17/0258* (2013.01); *B25J 17/0266* (2013.01); *B25J 19/0029* (2013.01); *H02K 37/24* (2013.01); *B23Q 1/5462* (2013.01)

(58) Field of Classification Search
CPC ......... B25J 17/02; B25J 19/0029; B23Q 5/10; B23Q 1/0009; B23Q 1/5462; B23Q 1/5406; B23P 19/04
See application file for complete search history.

(56) References Cited

U.S. PATENT DOCUMENTS

| | | | |
|---|---|---|---|
| 5,584,621 A | 12/1996 | Bertsche et al. | |
| 7,293,340 B1 | 11/2007 | Tsao et al. | |
| 7,513,174 B2 * | 4/2009 | Harada | B25J 17/0283 74/490.02 |
| 7,938,603 B2 * | 5/2011 | Tatsuda | B23Q 1/5406 409/216 |
| 8,396,596 B2 | 3/2013 | Oka et al. | |
| 8,511,199 B2 * | 8/2013 | Long | B25J 17/0258 74/490.05 |
| 2005/0217095 A1 | 10/2005 | Gstir et al. | |
| 2010/0310335 A1 * | 12/2010 | Tatsuda | B23Q 1/70 409/204 |
| 2012/0020754 A1 | 1/2012 | Ou et al. | |
| 2012/0103127 A1 | 5/2012 | Liu | |
| 2013/0340560 A1 | 12/2013 | Burridge et al. | |
| 2015/0122072 A1 | 5/2015 | Wu et al. | |

FOREIGN PATENT DOCUMENTS

| | | |
|---|---|---|
| DE | 10 2005 006 221 A1 | 8/2006 |
| DE | 10 2006 054 475 A1 | 5/2008 |
| EP | 0 269 751 A1 | 6/1988 |
| EP | 0331914 A2 | 9/1989 |
| EP | 2 014 409 A1 | 1/2009 |
| EP | 2 080 581 A1 | 7/2009 |
| EP | 2 204 258 A1 | 7/2010 |
| EP | 1829652 B1 | 4/2011 |
| JP | S59175964 A | 10/1984 |
| JP | S59175965 A | 10/1984 |
| JP | H01-234191 A | 9/1989 |
| JP | H05-077192 A | 3/1993 |
| JP | H07-124887 A | 5/1995 |
| JP | H07314377 A | 12/1995 |
| JP | H08-019985 A | 1/1996 |
| JP | H08289513 A | 11/1996 |
| JP | H09141593 A | 6/1997 |
| JP | H11-207684 A | 8/1999 |
| JP | 3095032 B | 10/2000 |
| JP | 2007229874 A | 9/2007 |
| JP | 2011-016183 A | 1/2011 |
| JP | 2014111299 A | 6/2014 |
| JP | 2015-147265 A | 8/2015 |

OTHER PUBLICATIONS

Office Action dated Oct. 19, 2018, by the Japan Patent Office in corresponding Japanese Patent Application No. 2016-051348. (6 pages).

International Search Report (PCT/ISA/210) dated May 16, 2017, by the Japanese Patent Office as the International Searching Authority for International Application No. PCT/JP2017/008753.

Written Opinion (PCT/ISA/237) dated May 16, 2017, by the Japanese Patent Office as the International Searching Authority for International Application No. PCT/JP2017/008753.

Office Action dated Jan. 15, 2021 issued in corresponding Chinese Patent Application No. 201780016993.3 (8 pages).

Extended European Search Report dated Jan. 10, 2020, issued by the European Patent Office in corresponding European Application No. 19200997.5. (7 pages).

* cited by examiner

WORKING UNIT AND WORKING DEVICE

This application is a continuation of International Patent Application No. PCT/JP2017/008753 filed on Mar. 6, 2017, and claims priority to Japanese Patent Application No. 2016-051348 filed on Mar. 15, 2016, the entire content of both of which is incorporated herein by reference.

TECHNICAL FIELD

The present invention relates to a working unit and a working device.

BACKGROUND ART

There is a working robot that moves a working tool for performing predetermined work (such as machining, assembly, or measurement) on a workpiece, which is a working target, placed at a placement position in a working area, and positions the tool at an optimal angle for the work.

In Japanese Patent Laid-Open No. 59-175964, there is described a working robot that includes a tip end unit including a tool rotation mechanism that rotates a working tool in a horizontal direction, a tool movement mechanism that moves the tool at a predetermined angle in a vertical direction, an orthogonal movement mechanism that moves the tip end unit to a working position for a work piece disposed at a predetermined position in a working area, and a workpiece turning mechanism that holds the workpiece and turns the workpiece in the horizontal direction.

In Japanese Patent Laid-Open No. 59-175965, there is described a working robot that includes a tip end unit including a tool rotation mechanism that rotates a working tool in a horizontal direction, a tool movement mechanism that moves the tool at a predetermined angle in a vertical direction, a lifting and lowering movement mechanism that vertically moves the tip end unit to a working position for a work piece disposed at a predetermined position in a working area, and a plane movement mechanism that moves the work piece disposed at the predetermined position in a plane at a predetermined height in the working area.

In Japanese Patent No. 3095032, there is described a working robot that is a vertical articulated robot provided with a working tool for deburring a workpiece.

The device described in Japanese Patent Laid-Open No. 59-175964 cannot perform work on a workpiece that is still at a predetermined position from directions other than the horizontal direction, since the tip end unit can only turn the working tool about a horizontal axis that is parallel to the horizontal direction and rotate the tool in the horizontal direction.

To cope with the problem, the device described in Japanese Patent Laid-Open No. 59-175965 includes the horizontal rotation mechanism that rotationally drives a rotating table capable of rotating in the horizontal direction on which the workpiece is placed, so that the workpiece can be rotated and moved to the working position so that various surfaces of the workpiece can be processed. However, a large movement mechanism is needed to move a heavy or large workpiece, and the device is inevitably large-scale.

The device described in Japanese Patent No. 3095032 is a vertical articulated robot having a working tool attached to the tip end thereof for work. However, when the robot performs work on a workpiece at a high level from the base of the robot, arms of the robot can interfere with each other, so that the vertical articulated robot needs to be larger than necessary.

SUMMARY OF INVENTION

In view of such circumstances, an object of the present invention is to provide a working unit and a working device that efficiently perform work on a workpiece disposed in a preset working area from many directions.

According to an aspect of the present invention, there is provided a working unit to which a tool for performing work on a workpiece disposed in a working space is attached, the working unit comprising: a tool rotation mechanism that rotates the tool; a first turning mechanism that turns the tool rotation mechanism about a first axis; and a second turning mechanism that turns the tool rotation mechanism and the first turning mechanism about a second axis perpendicular to the first axis, wherein the first turning mechanism includes: a motor that has a stator connected to the second turning mechanism and a rotor that is a hollow shaft-shaped rotor and is arranged inside an inner periphery of the stator in such a manner that the rotor is capable of rotating about the first axis as a central axis; and a second rotating body that includes one arm portion coupled to one end portion of the rotor, the other arm portion coupled to the other end portion of the rotor, and an arm coupling portion that couples the one arm portion and the other arm portion to each other, and the tool rotation mechanism is provided on the second rotating body.

Further features of the present invention will become apparent from the following description of exemplary embodiments with reference to the attached drawings.

DESCRIPTION OF EMBODIMENTS

Figure 1A:
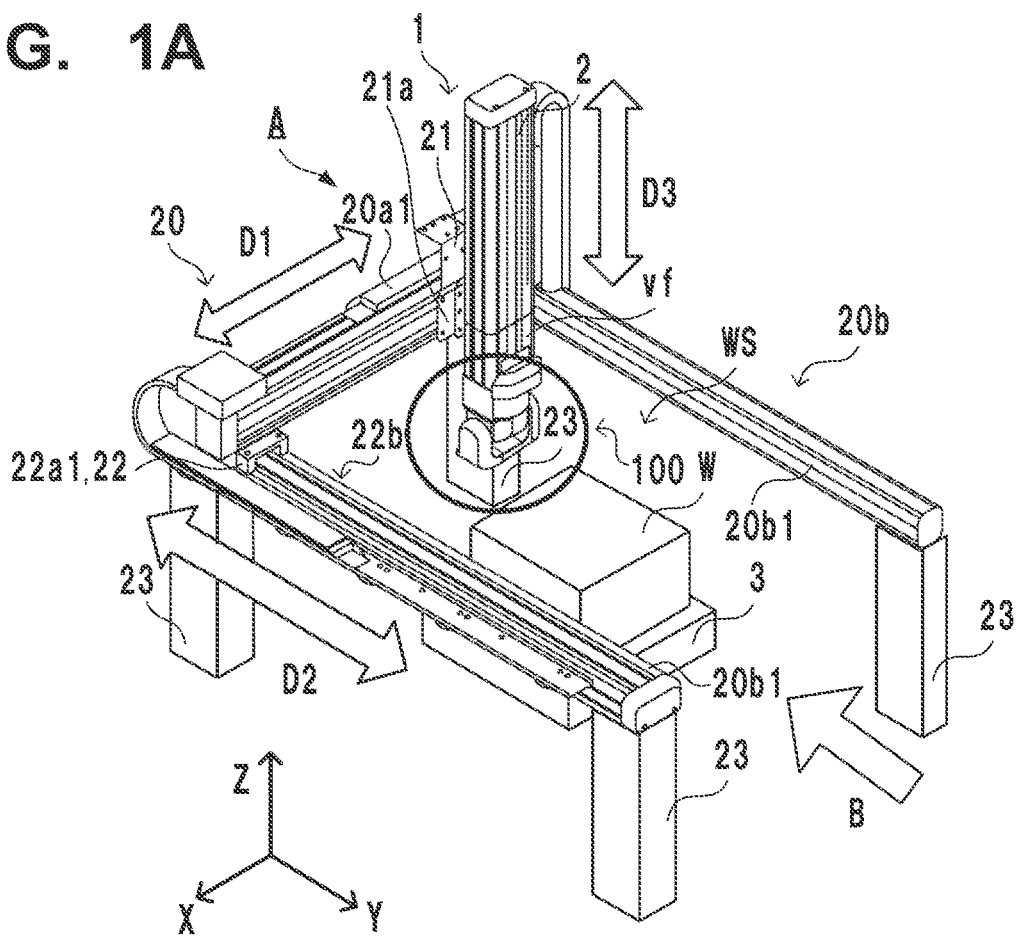
FIG. 1A is a diagram for illustrating a working device according to an embodiment of the present invention.

In the following, an illustrative embodiment of the present invention will be described with reference to the drawings. In the drawings, the same reference numerals denote the same elements, and in the description herein, the vertical and horizontal directions in the drawings will be used to indicate the vertical and horizontal directions of devices or members thereof according to the embodiment.

FIG. 1A is a perspective view of a working device A including a working unit 100 according to an embodiment of the present invention. In FIG. 1A, the arrows X and Y indicate two horizontal directions perpendicular to each other, and the arrow Z indicates a vertical direction. The working device A includes a plane movement mechanism 1 that moves the working unit 100 in a predetermined plane set in a working space WS described later, and a vertical movement mechanism 2 that moves the working unit 100 in a vertical plane perpendicular to the predetermined plane set in the working space WS. The plane movement mechanism 1 includes a plane guide portion 20 that guides the movement of the vertical movement mechanism 2.

The plane guide portion 20 includes a first plane guide portion 20a that extends in the X direction, and a pair of second plane guide portions 20b that extend in the Y direction. The first plane guide portion 20a includes a first frame member 20a1 that is provided with a guide portion (not shown) for guiding the movement of the vertical movement mechanism 2 and extends in the X direction. The pair of second plane guide portions 20b include a pair of second frame members 20b1 that are each provided with a guide portion (not shown) for guiding the movement of the first frame member 20a1 and extend in the Y direction. The pair of second frame members 20b1 are arranged in parallel with each other and spaced apart from each other in the X direction.

The plane movement mechanism 1 includes a first movement mechanism 21 that moves the vertical movement mechanism 2 in the X direction and a second movement mechanism 22 that moves the vertical movement mechanism 2 in the Y direction. The first movement mechanism 21 is provided with a first moving body 21a that moves following the guide by the first plane guide portion 20a, and a first drive mechanism (not shown) that moves the first moving body 21a. The vertical movement mechanism 2 is provided on the first moving body 21a and thereby moved in the X direction. The second movement mechanism 22 includes a pair of second moving bodies 22a1 that move following the guides by the pair of second plane guide portions 20b, and a second drive mechanism (not shown) that moves the second moving bodies 22a1. The first movement mechanism 21 is supported by the second moving bodies 22a1 and thereby moved in the Y direction, and the vertical movement mechanism 2 can be moved between the pair of second frame members 20b1 by the first movement mechanism 21 and the second movement mechanism 22.

The vertical movement mechanism 2 is supported by the first moving body 21a in such a manner that the vertical movement mechanism 2 can be raised and lowered, and includes a vertical frame member of that moves in the Z direction, and a vertical drive mechanism (not shown) that moves the vertical frame member vf in the Z direction. The working unit 100 described later is provided on a lower end of the vertical frame member vf.

The first movement mechanism 21, the second movement mechanism 22, and the vertical movement mechanism 2 may be sliders based on the ball screw mechanism, for example, but are not limited thereto. For example, the movement mechanisms may be rack and pinion mechanisms, nut and ball screw mechanisms, or belt transmission mechanisms that uses a motor or the like as a drive source.

The working device A further includes strut portions 23 that support the plane guide portion 20 so that the working unit 100 can be moved in the working space. Four strut portions 23 are arranged to provide four corners under the pair of second movement mechanisms 22. The working device A has the working space WS defined by the four corner strut portions 23 below the plane guide portion 20. In the working space WS, a placement unit 3, on which a workpiece W is placed and held, is arranged. The workpiece W is placed on the placement unit 3.

Figure 1B:
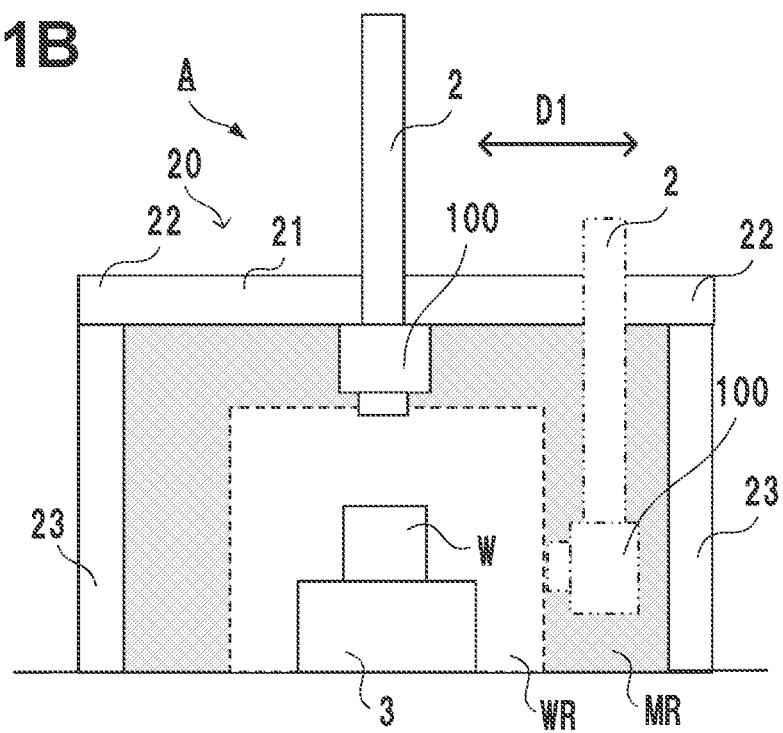
FIG. 1B is a diagram for illustrating a working range of the working device shown in FIG. 1A.

FIG. 1B is a diagram for illustrating a working range in the working space WS of the working device A viewed in the direction of the arrow B in FIG. 1A. In FIG. 1B, the region defined by the working range indicated by the chain line surrounding the placement unit 3 and the workpiece W is an effective working range WR. The shaded region outside the effective working range WR in FIG. 1B is a tool movement range MR. The effective working range WR is a range in which the working unit 100 can perform work on the workpiece W by being moved in the tool movement range MR by the first movement mechanism 21, the second movement mechanism 22, and the vertical movement mechanism 2. Therefore, the working unit 100 can perform work on the workpiece placed on the placement unit 3 so long as the workpiece has such a size that the workpiece can be placed in the effective working range WR. Although the effective working range WR is described as a range surrounded by the chain line in this embodiment for the sake of explanation, the effective working range WR can be arbitrarily set within the range of the working space WS by moving the working unit 100 by controlling the operation of the first movement mechanism 21, the second movement mechanism 22, and the vertical movement mechanism 2 so that the workpiece W and the placement unit 3 do not interfere with the working unit 100.

The working unit 100 is moved in the tool movement range MR by the plane guide portion 20 and the vertical movement mechanism 2, and is positioned with a tool T turned toward the workpiece W by a turning mechanism described later. Thus, in the working space WS, the working unit 100 can access the workpiece W from all the directions except the direction of the placement unit 3 to perform work on the workpiece W.

Figure 2:
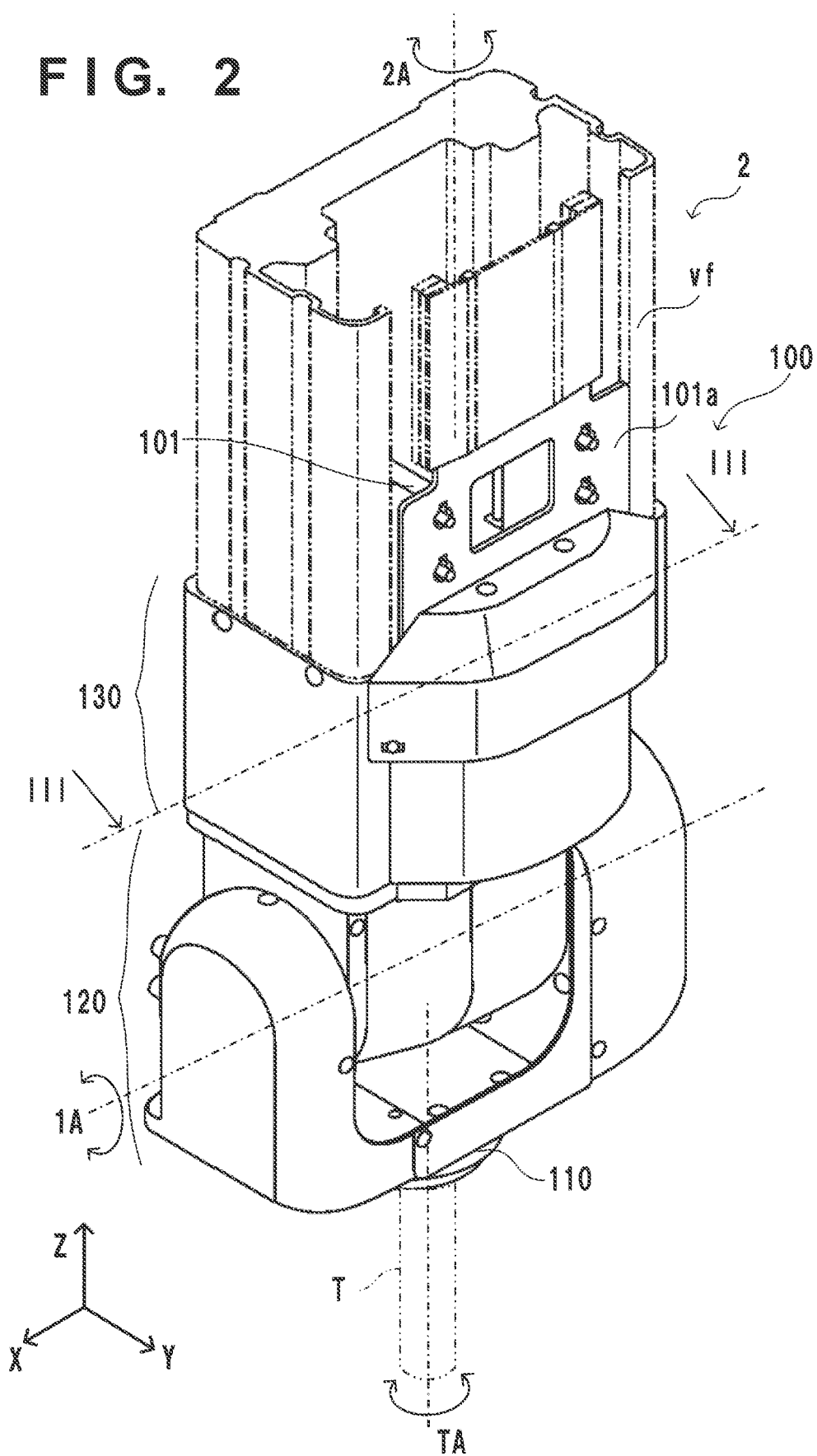
FIG. 2 is a partial perspective view of a working unit.

FIG. 2 is a partial perspective view of the working unit 100. FIG. 2 shows the working unit 100 attached to the lower end of the vertical movement mechanism 2. The working unit 100 is attached to the lower end of the vertical frame member vf of the vertical movement mechanism 2 positioned above the working unit 100 in the drawing by an attachment portion 101. The working unit 100 is attached to the vertical movement mechanism 2 directly below the vertical movement mechanism 2 in the Z direction. As a result, a rotational axis TA of the tool T described later and the central position of the z axis of the vertical movement mechanism 2 in the X-Y plane can be aligned with each other.

The working unit 100 includes a tool rotation mechanism 110 to which the tool T (indicated by the alternate long and two short dashes line) that performs work on the workpiece W disposed in the working space WS is rotatably attached, and a first turning mechanism 120 that turns the tool rotation mechanism 110 about a first axis 1A. The first axis 1A is an axis extending in a direction parallel with the X direction in FIG. 2 about which and the tool T is turned in the Y-Z plane by the first turning mechanism 120.

The working unit 100 further includes a second turning mechanism 130 that turns the tool rotation mechanism 110 and the first turning mechanism 120 about a second axis 2A perpendicular to the first axis 1A. The second axis 2A is an axis extending in a direction parallel with the Z direction in FIG. 2 about which the first turning mechanism 120 and the tool T are turned in the X-Y plane by the second turning mechanism 130. The tool rotation mechanism 110 rotates the tool T about the rotational axis TA of the tool that extends in the Z direction in FIG. 2.

Figure 3:
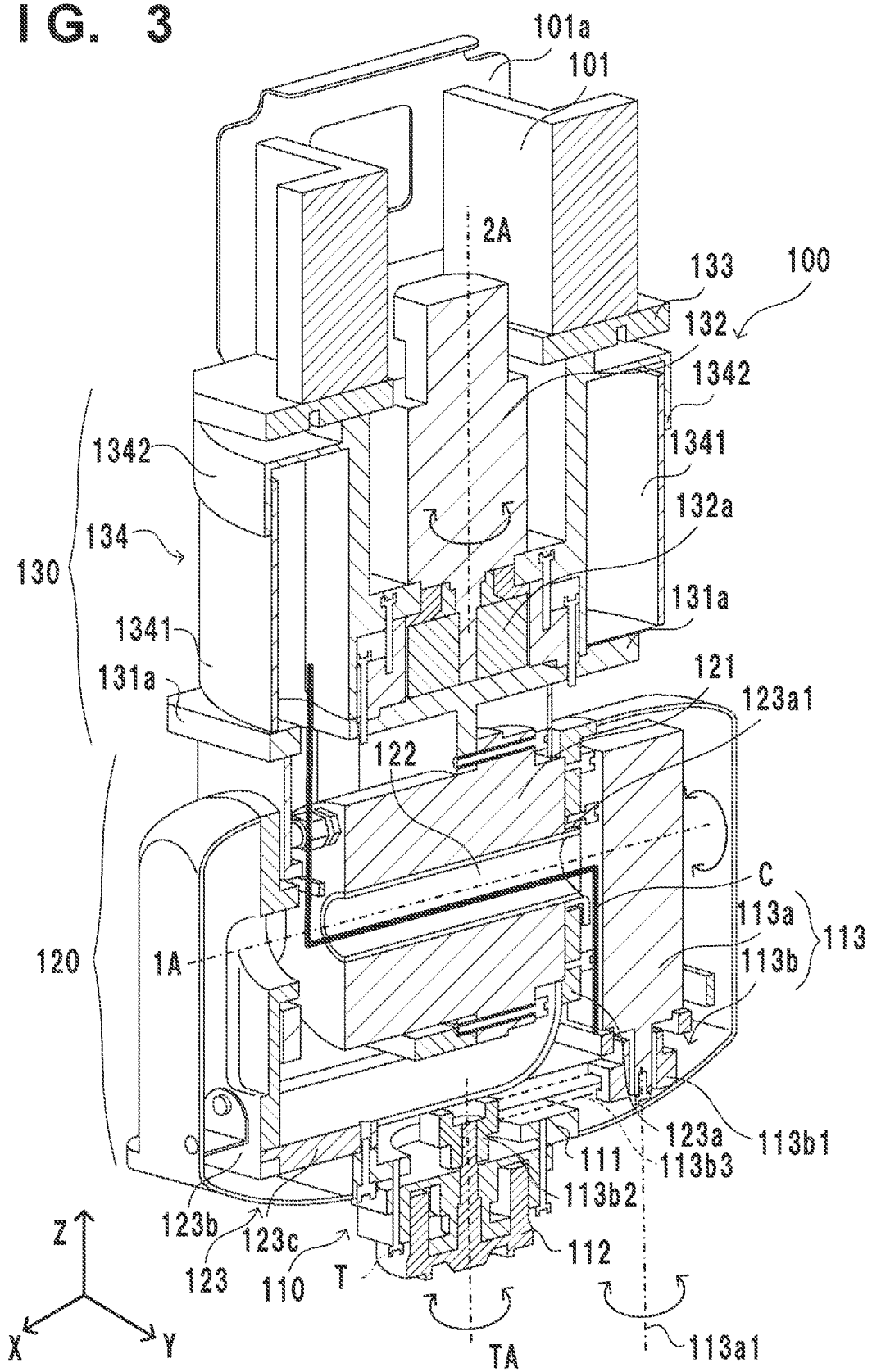
FIG. 3 is a cross-sectional view of the working unit shown in FIG. 2.
Figure 4A:
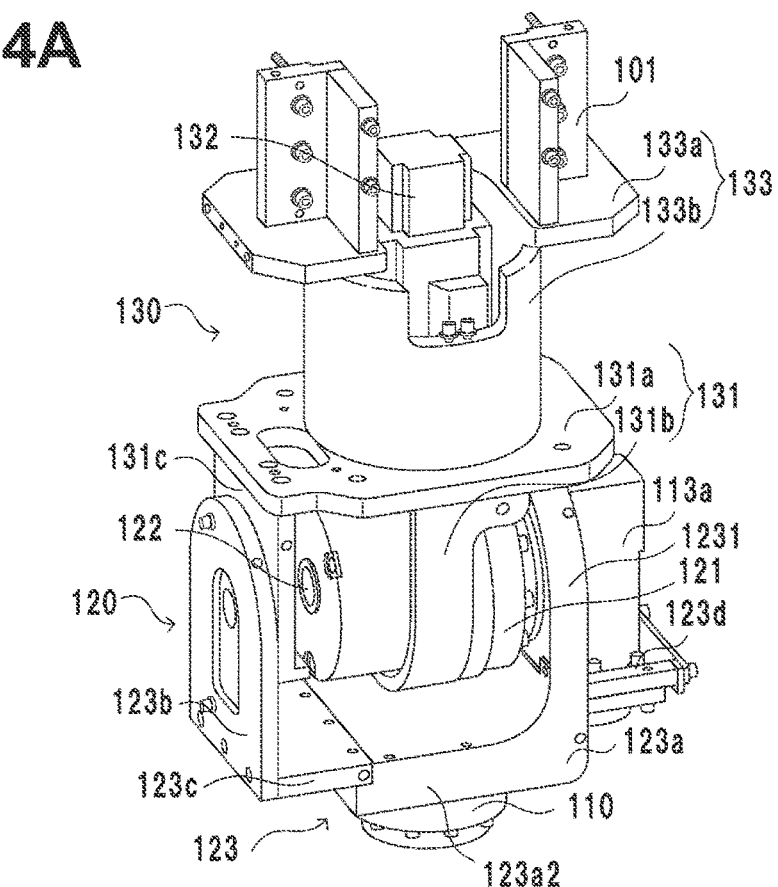
FIG. 4A is a perspective view for illustrating the working unit shown in FIG. 2.
Figure 4B:
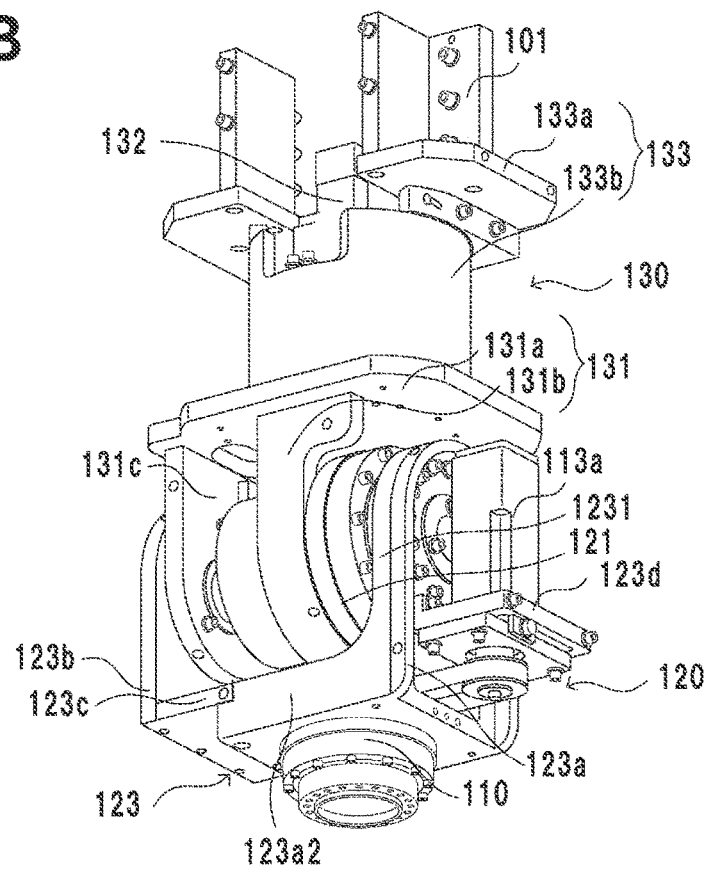
FIG. 4B is a perspective view for illustrating the working unit shown in FIG. 2.

FIG. 3 is a schematic cross-sectional view taken along the line indicated by the arrows III in FIG. 2. FIGS. 4A and 4B are perspective views of the first turning mechanism 120 and the second turning mechanism 130. In FIG. 3, illustration of exterior components of the vertical frame of of the vertical mechanism 2 and the second turning mechanism 130 shown in FIG. 2 is omitted. FIGS. 4A and 4B show the working unit 100 in FIG. 2 with exterior components thereof removed.

FIG. 4A is a perspective view of the working unit 100 viewed from one direction, and FIG. 4B is a perspective of the same viewed from another direction.

<Second Turning Mechanism 130>

The second turning mechanism 130 includes a rotating stage 131 that supports the first turning mechanism 120, a second rotational drive source 132 that rotates the rotating stage 131 about the second axis 2A, and a supporting body 133 that supports the second rotational drive source 132.

As shown in FIGS. 3, 4A, and 4B, the rotating stage 131 includes a rotatable connection portion 131a connected to a reducer 132a, and a connection portion 131b on which a stator 121 described later is fixedly supported. The rotating stage 131 further includes an arm supporting portion 131c connected to the rotatable connection portion 131a and thereby supported, to which the other arm portion 123b described later is rotatably connected. The second rotational drive source 132 is supported by the supporting body 133 and coupled to the rotating stage 131 via the reducer 132a (illustration of the detailed mechanism of which is omitted). The reducer 132a may be a reduction gear, for example. However, the reducer 132a is not limited thereto and may be a trochoid reduction gear or the like.

The supporting body 133 includes a supporting portion 133a connected to the attachment portion 101 attached to the lower end of the vertical frame vf, and a motor housing portion 133b that is connected to the supporting portion 133a and houses the second rotational drive source 132. In this embodiment, the motor housing portion 133b is a cylindrical member, in which a supporting portion (not shown) that supports the second rotational drive source 132 is provided. A housing supporting portion 1342, which is a portion of a housing portion 134 described later, is provided around the outer periphery of the supporting body 133. The supporting body 133 further includes a cover supporting portion 101a that supports a cover of the vertical frame vf of the vertical movement mechanism 2 on the supporting portion 133a.

The second turning mechanism 130 includes the housing portion 134 that houses a cable C described later that is connected to the first turning mechanism 120 through the vertical frame vf, the supporting body 133, and the rotating stage 131. The housing portion 134 includes a cylindrical housing rotation portion 1341, which is a portion of the housing portion 134, that is connected to the rotating stage 131 so as to surround the outer periphery of the motor housing portion 133b and moves along with the rotating stage 131, and the housing supporting portion 1342, which is a portion of the housing portion 134, that is connected to the outer periphery of the motor housing portion 133b of the supporting body 133. The housing rotation portion 1341 and the housing supporting portion 1342 of the housing portion 134 are arranged to partially overlap with each other, and the housing rotation portion 1341 can rotate with respect to the housing supporting portion 1342.

<First Turning Mechanism 120>

The first turning mechanism 120 includes the stator 121 connected to the second turning mechanism 130, and a rotor 122 provided inside the stator 121. The stator 121 is fixed to the rotating stage 131 of the second turning mechanism 130 and rotates integrally with the rotating stage 131. The stator 121 is a cylindrical member that is arranged with the longitudinal direction thereof aligned with the X direction in FIG. 3.

The rotor 122 is a hollow shaft-shaped member that is arranged inside the inner periphery of the stator 121 in such a manner that the rotor 122 can rotate about the first axis 1A as a central axis. The cable C described later can be inserted and arranged in the hollow rotor 122. Therefore, the stator 121 and the rotor 122 form a hollow motor with the rotor 122 rotating with respect to the stator 121.

A second rotating body 123 that holds the tool rotation mechanism 110 is fixed to the rotor 122. The second rotating body 123 includes one arm portion 123a that is coupled to one end portion (the right end portion in the X direction in the drawing) of the rotor 122. The one arm portion 123a includes a connection arm portion 1231 that is connected to the one end portion of the rotor 122 on one side thereof, and a tool supporting arm portion 123a2 that is arranged in parallel with the first axis 1A and is provided with the tool rotation mechanism 110 described later on the other side thereof. The second rotating body 123 includes the other arm portion 123b that is provided on the side of the other end portion of the rotor 122 (on the left side in the X direction in the drawing) and is rotatably coupled to the arm supporting portion 131c, and an arm coupling portion 123c that couples the one arm portion 123a and the other arm portion 123b to each other. The second rotating body 123 is not limited to the implementation described above, and the other arm portion 123b may be coupled to the rotor 122, for example.

Since the motor including the hollow shaft-shaped rotor 122 is adopted as described above, the cable C for supplying electric power or the like to the tool rotation mechanism 110 can be arranged in the rotor 122. For example, as shown in FIG. 3, the cable C from a rotational drive source 113a of the tool rotation mechanism 110 described later may be routed from the side of the one arm portion 123a to the side of the other arm portion 123b through the rotor 122 and then routed upward into a housing space 134a of the housing portion 134.

Figure 5:
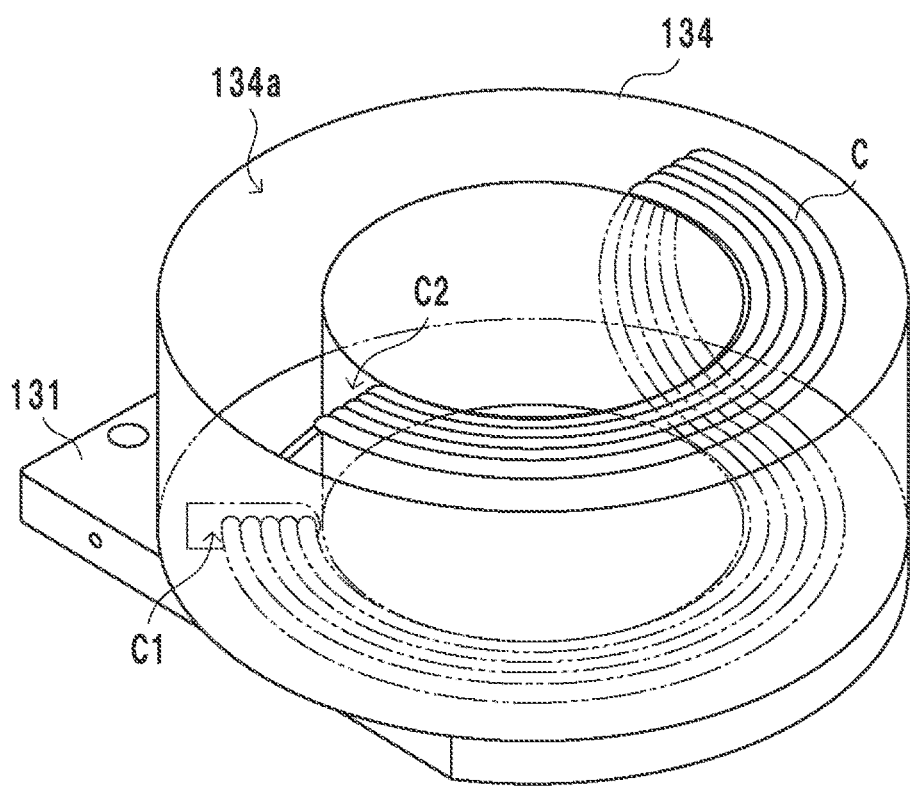
FIG. 5 is a perspective view showing a housing portion for a wire.

Furthermore, as shown in FIG. 5, a round cable may be used as the cable C, for example. The cable C extending from the first turning mechanism 120 is routed into a main section 134a through a portion (a rotational communication portion formed in the rotating stage 131) denoted by C1 in the drawing. The cable C is then routed in the housing space 134a in two vertical layers and then to the vertical frame vf of the vertical movement mechanism 2 (not shown in the drawing) through a portion (a supporting communication portion formed in the supporting body 133) denoted by C2 in the drawing. By adopting the round cable, the cable C can be routed in a smaller space and can be routed without a break even if the rotating stage 131 rotates 360 degrees or more with respect to the supporting body 133.

Therefore, according to this embodiment, the one arm portion 123a includes a communication portion 123a1 formed in the connection arm portion 1231 in which the cable (wire) C can be connected to the tool rotation mechanism 110 through the hollow portion of the rotor 122. Therefore, routing of the cable C can be improved, the size and weight of the working unit 100 can be reduced, and the dead space can be reduced.

<Tool Rotation Mechanism 110>

Referring again to FIGS. 3, 4A and 4B, the tool rotation mechanism 110 includes a main body portion 111 that is supported by the second rotating body 123 connected to the rotor 122, a rotating body 112 that is attached to the main body portion 111 and rotates the tool T, and a drive transmission portion 113 that transmits a rotational drive force to the rotating body 112. The main body portion 111 is fixed to a lower surface of the tool supporting arm portion 123a2 of the second rotating body 123. The rotating body 112 is held on the main body portion 111 in such a manner that the rotating body 112 can rotate with respect to the main body portion 111, and can turn about the rotational axis TA of the tool. The rotating body 112 is rotated by the rotational drive force supplied from the rotational drive source 113*a* described later of the drive transmission portion 113, thereby rotating the tool attached thereto. The rotating body 112 has a tool attachment portion for the tool T (not shown).

The drive transmission portion 113 includes the rotational drive source 113*a* that supplies a rotational drive force, and a transmission mechanism 113*b* that transmits the rotational drive force from the rotational drive source 113*a* to the rotating body 112. In this embodiment, the rotational drive source 113*a* is disposed on a drive supporting portion 123*d* provided adjacent to (offset from) the one arm portion 123*a* of the second rotating body 123 in the direction of extension of the first axis 1A. The rotational drive source 113*a* is provided in such a manner that a drive rotational axis 113*a*1 thereof is in parallel with the rotational axis TA of the tool and is offset from the rotational axis TA of the tool in the direction of extension of the first axis 1A (in the radial direction from the rotational axis of the tool).

In this embodiment, the tool rotation mechanism 110 and the rotational drive source 113*a* that rotates the tool rotation mechanism 110 are not directly coupled to each other in the vertical direction (Z axis direction) but are coupled to each other by the transmission mechanism 113*b*. Specifically, the rotational drive source 113*a* is not coupled to a lower side in the vertical direction (Z axis direction) of the first turning mechanism 120 in the state shown in FIG. 3 but is coupled to the rotating body 112 of the first turning mechanism 120. In other words, the second axis 2A of the second turning mechanism 130 and the drive rotational axis 113*a*1 of the rotational drive source 113*a* are not aligned with each other, and the drive rotational axis 113*a*1 is arranged offset from the second axis 2A in the direction of extension of the first axis 1A. The tool rotation mechanism 110 is coupled to the offset-arranged drive rotational axis 113*a*1 by the transmission mechanism 113*b*. The rotational axis TA of the tool in the tool rotation mechanism 110 is aligned with the second axis 2A. Thus, as compared with a case where the second axis 2A, the drive rotational axis 113*a*1, and the rotational axis TA of the tool are aligned with each other, the distance from the lower end of the vertical frame member vf of the vertical movement mechanism 2 to the tool attachment portion of the rotating body 112 can be reduced. Therefore, working in the working range in the predetermined working area can be performed efficiently.

The transmission mechanism 113*b* may be a belt transmission mechanism in this embodiment. The belt transmission mechanism may include a driving pulley 113*b*1 fixed to the drive rotational axis 113*a*1 of the rotational drive source 113*a*, a driven pulley 113*b*2 fixed to the rotating body 112, and a driving belt 113*b*3 wound around the driving pulley 113*b*1 and the driven pulley 113*b*2. Therefore, the rotational drive force from the rotational drive source 113*a* is transmitted to the tool via the drive rotational axis 113*a*1, the driving pulley 113*b*1, the driving belt 113*b*3, the driven pulley 113*b*2, and the rotating body 112. The transmission mechanism 113*b* is not limited to the belt transmission mechanism, but may include a plurality of gears coupled to transmit a drive force or a drive shaft used to transmit a drive force, for example.

The extension line of the rotational axis TA of the tool passes through an intersection of the first axis 1A of the first turning mechanism 120 and the second axis 2A of the second turning mechanism 130. That is, when the tool is turned about the first axis 1A by the first turning mechanism 120, the distance between the first axis 1A and the tool does not change. Furthermore, when the first turning mechanism 120 is turned by the second turning mechanism 130, the distance between the second axis 2A and the tool does not change. Therefore, the position of the tool can be accurately grasped.

<Control Unit 500>

Figure 6:
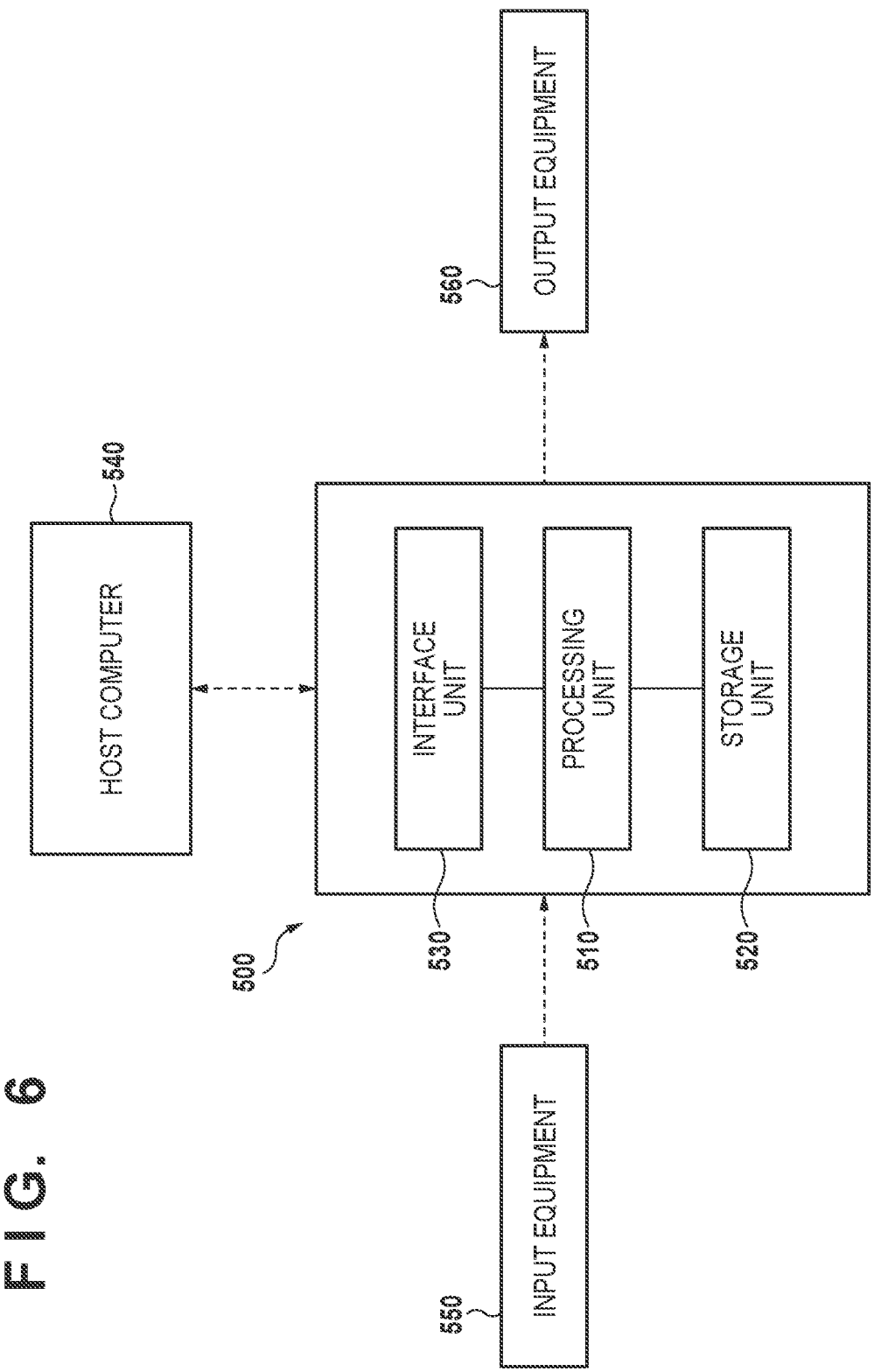
FIG. 6 is a block diagram showing a control unit.

FIG. 6 is a block diagram showing a control unit 500 that controls the working device A according to this embodiment. The control unit 500 includes a processing unit 510, a storage unit 520, and an interface unit 530, which are connected to each other by a bus (not shown). The processing unit 510 executes a program stored in the storage unit 520. The processing unit 510 is a CPU, for example. The storage unit 520 is a RAM, a ROM, or a hard disk or the like, for example. The interface unit 530 is provided between the processing unit 510 and an external device (a host computer 540, input equipment (a sensor, for example) 550 and output equipment (an actuator for each drive mechanism, for example) 560), and is a communication interface or an I/O interface or the like, for example.

With the working unit 100 and the working device A according to this embodiment described above, since the axial center 2A along the Z axis of the vertical movement mechanism 2 and the axial center TA along the Z axis of the working unit 100 are aligned with each other, the moment rigidity of the vertical movement mechanism 2 and the working unit 100 is improved, and the working unit 100 can carry a greater weight. In addition, since the hollow shaft-shaped rotor is adopted, routing of the cable is improved, and the weight and size of the working unit 100 can be reduced. In addition, although the rotational axis TA of the tool of the tool rotation mechanism 110 is aligned with the axial center 2A along the Z axis of the vertical movement mechanism 2, the drive rotational axis 113*a*1 of the rotational drive source 113*a* of the tool rotation mechanism 110 is not aligned with but is offset from the axial center 2A along the Z axis of the vertical movement mechanism 2. In addition, the tool rotation mechanism 110 is coupled to the rotational drive source 113*a* by the transmission mechanism 113*b*. As a result, the distance between the lower end of the vertical frame member vf of the vertical movement mechanism 2 and the tool attachment portion of the rotating body 112 can be reduced, so that the working range in the working area can be efficiently used. Furthermore, since the cable C is routed in the housing portion 134, the cable C can be prevented from being broken by the first turning mechanism 120 when the first turning mechanism 119 is turned by the second turning mechanism 130.

The present invention is not limited to the above embodiment, and various changes and modifications can be made within the spirit and scope of the present invention. Therefore, to apprise the public of the scope of the present invention, the following claims are made.

The invention claimed is:

1. A working unit to which a tool for performing work on a workpiece disposed in a working space is attached, the working unit comprising:
   a tool rotation mechanism that rotates the tool;
   a first turning mechanism that turns the tool rotation mechanism about a first axis; and
   a second turning mechanism that turns the tool rotation mechanism and the first turning mechanism about a second axis perpendicular to the first axis,
   wherein the first turning mechanism includes:
   a motor that has a stator connected to the second turning mechanism and a rotor that is a hollow shaft-shaped rotor and is arranged inside an inner periphery of the stator in such a manner that the rotor is capable of rotating about the first axis as a central axis; and a second rotating body that includes a first arm portion coupled to a first end portion of the rotor, a second arm portion that is at a side of a second end portion of the rotor and is not coupled to the rotor, and an arm coupling portion that couples the first arm portion and the second arm portion to each other, wherein the second turning mechanism includes a second motor as a driving source of the second turning mechanism, wherein the tool rotation mechanism includes:

a main body that is provided on the second rotating body and is connected to the rotor;

a rotating body that is attached to the main body and rotates the tool; and a drive transmission portion that transmits a rotational drive force to the rotating body, wherein the drive transmission portion includes:

a rotational drive source that supplies the rotational drive force; and a transmission mechanism that transmits the rotational drive force from the rotational drive source to the rotating body, and wherein the rotational drive source is arranged so that a drive rotational axis of the rotational drive source is parallel with a rotational axis of the tool and is offset from the rotational axis of the tool in a direction of extension of the first axis.

2. The working unit according to claim 1, wherein an extension line of the rotational axis of the tool passes through an intersection of the first axis of the first turning mechanism and the second axis of the second turning mechanism.

3. The working unit according to claim 1, wherein the transmission mechanism is a belt transmission mechanism.

4. The working unit according to claim 1, wherein the first arm portion has a communication portion through which a wire connected to the tool rotation mechanism is capable of being routed through a hollow portion of the rotor.

5. The working unit according to claim 4, wherein the second turning mechanism includes:

a rotating stage that supports the first turning mechanism;
the second motor that rotates the rotating stage about the second axis; and
a supporting body that supports the second rotational drive source.

6. The working unit according to claim 5, wherein the second turning mechanism includes a housing portion that houses the wire routed from the supporting body to the rotating stage around an outer periphery side of the second rotational drive source.

7. A working device, comprising:
the working unit according to claim 1;
a plane movement mechanism that moves the working unit in a predetermined plane set in the working space; and a vertical movement mechanism that moves the working unit in a vertical plane perpendicular to the predetermined plane set in the working space.

8. The working device according to claim 7, further comprising:
a placement unit arranged in the working space on which the workpiece is placed and held.

9. The working device according to claim 8, wherein the plane movement mechanism includes a plane guide portion that guides a movement of the vertical movement mechanism, and the working device further comprises a strut portion that supports the plane guide portion in such a manner that the working unit is capable of being moved in the working space.

10. A working unit to which a tool for performing work on a workpiece disposed in a working space is attached, the working unit comprising:

a tool rotation mechanism that rotates the tool;

a first turning mechanism that turns the tool rotation mechanism about a first axis; and a second turning mechanism that turns the tool rotation mechanism and the first turning mechanism about a second axis perpendicular to the first axis, wherein the second turning mechanism includes a rotating stage that supports the first turning mechanism, wherein the first turning mechanism includes:

a motor that has a stator connected to the second turning mechanism and a rotor that is a hollow shaft-shaped rotor and is arranged inside an inner periphery of the stator in such a manner that the rotor is capable of rotating about the first axis as a central axis; and a second rotating body that includes a first arm portion coupled to a first end portion of the rotor, a second arm portion that is at a side of a second end portion of the rotor, is distinct from the second end portion of the rotor and is coupled to the arm supporting portion, and an arm coupling portion that couples the first arm portion and the second arm portion to each other, and the tool rotation mechanism includes a tool rotation motor as a driving source of the tool rotation mechanism and is provided on the second rotating body.

11. The working unit according to claim 10, wherein the first arm portion has a communication portion through which a wire connected to the tool rotation mechanism is capable of being routed through a hollow portion of the rotor.

12. The working unit according to claim 11, wherein the second turning mechanism includes:

a second rotational drive source that rotates the rotating stage about the second axis; and a supporting body that supports the second rotational drive source.

13. The working unit according to claim 12, wherein the second turning mechanism includes a housing portion that houses the wire routed from the supporting body to the rotating stage around an outer periphery side of the second rotational drive source.

* * * * *